United States Patent
Saito

[19]

[11] Patent Number: 5,930,386

[45] Date of Patent: Jul. 27, 1999

[54] IMAGE PROCESSING APPARATUS AND METHOD

[75] Inventor: Kazuhiro Saito, Kawasaki, Japan

[73] Assignee: Canon Kabushiki Kaisha, Tokyo, Japan

[21] Appl. No.: 08/383,684

[22] Filed: Feb. 1, 1995

Related U.S. Application Data

[63] Continuation of application No. 07/872,286, Apr. 22, 1992, abandoned.

[30] Foreign Application Priority Data

Apr. 23, 1991 [JP] Japan ................................ 3-092311

[51] Int. Cl.$^6$ ........................................................ G06K 9/34
[52] U.S. Cl. ............................ 382/166; 382/176; 382/250
[58] Field of Search ..................................... 382/234, 248, 382/166, 176, 239, 250; 348/397

[56] References Cited

U.S. PATENT DOCUMENTS

| | | | |
|---|---|---|---|
| 4,353,096 | 10/1982 | Sakurai ................................. | 358/263 |
| 4,447,829 | 5/1984 | Schayes et al. ........................ | 358/260 |
| 4,580,162 | 4/1986 | Mori ..................................... | 358/135 |
| 4,797,945 | 1/1989 | Suzuki et al. ......................... | 382/56 |
| 4,887,151 | 12/1989 | Wataya ................................. | 358/80 |
| 4,974,071 | 11/1990 | Maeda ................................... | 358/80 |
| 4,987,480 | 1/1991 | Lippman et al. ....................... | 358/133 |
| 5,001,561 | 3/1991 | Haskell et al. ........................ | 358/133 |
| 5,023,919 | 6/1991 | Wataya ................................. | 382/54 |
| 5,036,391 | 7/1991 | Auvray et al. ........................ | 358/133 |
| 5,046,121 | 9/1991 | Yonekawa et al. .................... | 382/56 |
| 5,089,884 | 2/1992 | Suzuki et al. ......................... | 358/80 |
| 5,121,205 | 6/1992 | Ng et al. ............................... | 358/141 |
| 5,121,216 | 6/1992 | Chen et al. ............................ | 382/239 |
| 5,134,666 | 7/1992 | Imao et al. ............................ | 382/9 |
| 5,148,272 | 9/1992 | Acampora et al. .................... | 348/397 |
| 5,150,208 | 9/1992 | Otaka et al. ........................... | 358/133 |
| 5,185,655 | 2/1993 | Wakeland .............................. | 358/13 |
| 5,185,819 | 2/1993 | Ng et al. ............................... | 382/234 |
| 5,212,742 | 5/1993 | Narmile et al. ....................... | 382/234 |
| 5,253,078 | 10/1993 | Balkanski et al. .................... | 358/432 |
| 5,668,646 | 9/1997 | Katayama et al. .................... | 382/166 |
| 5,825,934 | 10/1998 | Ohsawa ................................. | 382/250 |

FOREIGN PATENT DOCUMENTS

| | | |
|---|---|---|
| 0042981 | 1/1982 | European Pat. Off. . |
| 0323363 | 7/1989 | European Pat. Off. . |
| 0400756 | 12/1990 | European Pat. Off. . |
| 9101613 | 2/1991 | WIPO . |
| WO9101613 | 2/1991 | WIPO . |

OTHER PUBLICATIONS

Patent Abstracts Japan, vol.014, No.489, Oct. 24, 1990.
Computer (IEEE Computing Futures) vol.22, No.11, Nov. 1989, Hung "Image Compression: The Emerging Standard for Color Images" pp. 20–29.
"JPEG Still Picture Compression Algorithm", pp. 4–48, Draft section 5–7, Dec. 1989.
"The JPEG Still Picture Compression Standard", Wallace, vol. 34, No. 4, Apr. 1991, pp. 30–44.
Wallace, "The JPEG Still Picture Compression Standard," 8070 Comm. ACM, 34 (1991), Apr., No. 4, pp. 30–44.
"JPEG Still Picture Compression Algorithm," JPEF–8–R5, Dec. 15, 1989, Secs. 5–7.

*Primary Examiner*—Christopher S. Kelley
*Attorney, Agent, or Firm*—Fitzpatrick, Cella, Harper & Scinto

[57] ABSTRACT

The invention is intended to prevent deterioration in image quality of an image comprising a mixture of a natural image area, a color character image area, etc. in a process of ADCT multi-value color image compression. In the ADCT process, input image data is separated in units of different image areas based on DCT coefficients after DCT. A quantization factor and a quantization table dedicated for natural image are used for the natural image area. For the color character image area, any suitable one of several quantization factors is selected depending on magnitude of an absolute value of the DCT coefficient, and a quantization table dedicated for character is used for quantization. With this arrangement, deterioration of the color character image, particularly, difference in deterioration of characters between different colors, can be prevented.

13 Claims, 5 Drawing Sheets

FIG. 1

FIG. 3

IMAGE PROCESSING APPARATUS AND METHOD

This application is a continuation of application Ser. No. 07/872,286 filed Apr. 22, 1992 now abandoned.

BACKGROUND OF THE INVENTION

1. Field of the Invention

The present invention relates to an image processing method and apparatus for compressing image data in an adaptive manner to an input image.

2. Related Background Art

As one of several techniques for compressing multi-value images, there has been proposed an ADCT (Adaptive Discrete Cosine Transform) compression method mainly applied to natural images. With this compression method, three primary (RGB) signals are converted into three components of Y, U and V. Of these components, the Y signal representing luminance is compressed at the same resolution, while the U, V signals representing chrominance components are compressed at a lowered resolution after sub sampling. In a step 1 of the compression, each component is subjected to DCT in units of 8×8 pixel blocks for conversion into a frequency space of 8×8 to thereby obtain DCT coefficients. In a step 2, quantization tables are respectively prepared for the luminance component (Y) and the chrominance components (U, V) so that the DCT coefficients are linearly quantized (divided) for each component using quantization values of 8×8 which are produced by multiplying quantization factors by respective elements of the 8×8 quantization table, thereby obtaining quantization coefficients. In a step 3, quantization coefficients are subjected to Huffman encoding.

However, when an image comprising a natural image area, a color character image area and a CG image area in a mixed pattern, for example, is compressed by using the prior art compression method as stated above, there is a severe shortcoming in that the quality of the color character image and the CG image deteriorates.

Also, it has not been conceived to separately perform quantization of the luminance data and the chrominance data in respective suitable manners.

SUMMARY OF THE INVENTION

An object of the present invention is to solve the problem as set forth above.

Another object of the present invention is to provide an image encoding apparatus which performs encoding in accordance with an original image.

To achieve the above object, according to the present invention, there is provided an image processing apparatus comprising input means for inputting luminance data and chrominance data representing an original; discriminating means for discriminating an image characteristic of the original and outputting a discrimination signal; first quantizing means for quantizing the luminance data; second quantizing means for quantizing the chrominance data; and control means for controlling parameters for said first and second quantizing means in accordance with the discrimination signal of said discriminating means.

Still another object of the present invention is to provide an image encoding apparatus which is highly efficient and excellent in quality.

To achieve the above object, according to the present invention, there is provided an image processing apparatus comprising generating means for generating luminance data and chrominance data; first quantizing means for quantizing the luminance data; second quantizing means for quantizing the chrominance data; control means for generating a control signal for said first and second quantizing means; and encoding means for encoding the control signal and outputting an encoded control signal.

Still another object of the present invention is to provide an image encoding apparatus which is simple.

To achieve the above object, according to the present invention, there is provided an image processing apparatus comprising generating means for generating luminance data and chrominance data; discriminating means for discriminating an image characteristic of an image represented by the luminance data and the chrominance data; first quantizing means for quantizing the luminance data; second quantizing means for quantizing the chrominance data; and control means for generating a common controlling signal for said first and second quantizing means in accordance with the discrimination result of said discriminating means.

Still another object of the present invention is to provide an image encoding apparatus which is suitable to process the luminance data and the chrominance data in parallel.

To achieve the above object, according to the present invention, there is provided an image processing apparatus comprising generating means for generating luminance data and chrominance data; first discriminating means for discriminating a characteristic of the luminance data and outputting a first discrimination signal; second discriminating means for discriminating a characteristic of the chrominance data and outputting a second discrimination signal; first quantizing means for quantizing the luminance data; second quantizing means for quantizing the chrominance data; and control means for controlling independently said first and second quantizing means in accordance with the first and second discrimination signals respectively.

Other objects and forms of the present invention will be apparent from the following description in conjunction with the drawings and the attached claims.

DETAILED DESCRIPTION OF PREFERRED EMBODIMENTS

In the following embodiments of the present invention, even when an image comprises a mixture of a natural image area, a color character image area and a CG image area, these areas are separated from one another and encoded in respective adaptive manners to prevent deterioration of the color character image, especially eliminate differences in deterioration between different colors, for improving quality of the natural image, the color character image and the CG image.

More specifically, input image data is separated in units of image areas such as a natural image area and a color character image area. A quantization factor and a quantization table dedicated for natural images are assigned to the natural image area. For the color character image area, any suitable one of several quantization factors can be selected depending on the magnitude of an absolute value of the DCT coefficient, and a quantization table dedicated for characters can be selected. This arrangement makes it possible to prevent deterioration of color characters in an image comprising a natural image area, a color character area, etc. in a mixed pattern, particularly, deterioration in image quality such as differences in deterioration of characters between different colors. The quantization factors and the image area separation parameter are determined by, for example, pre-scanning an image, making a frequency analysis, and calculating values suitable for each image to be processed.

Figure 1:
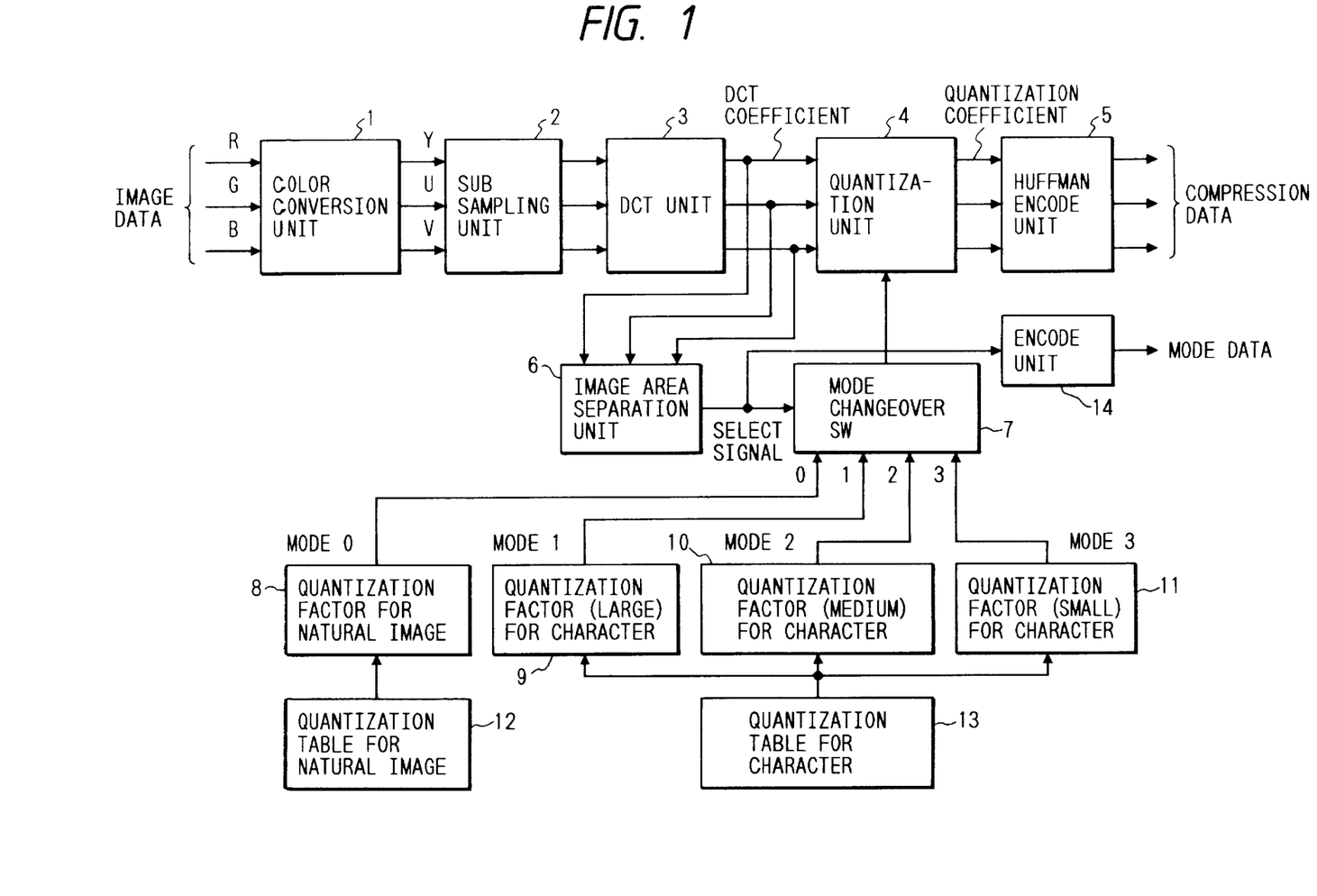
FIG. 1 is a block diagram of an embodiment of the present invention.

FIG. 1 shows a first embodiment of the present invention.

Image data of RGB inputted from an image scanner comprising CCDs or a host computer is converted in a color conversion unit 1 with the following linear matrix conversion formulas:

$$\begin{bmatrix} Y \\ U \\ V \end{bmatrix} = \begin{bmatrix} a11 & a12 & a13 \\ a21 & a22 & a23 \\ a31 & a32 & a33 \end{bmatrix} \begin{bmatrix} R \\ G \\ B \end{bmatrix} \quad (1.0)$$

into image data of YUV. Y represents an luminance component and U, V represent chrominance components. Considering the fact that human eyes are more sensitive to the luminance component (Y) than to the chrominance components (U, V), the components U, V are sub-sampled in a sub sampling unit 2 for conversion into data with ratio of Y:U:V=4:1:1 or 4:2:2. Then, the components Y, U, V are each subjected in a DCT unit 3 to frequency conversion in units of 8×8 pixel blocks. Thus-converted coefficients are called DCT coefficients.

An image area separation unit 6 judges whether each 8×8 pixel block belongs to a natural image block or a character image block depending on frequency characteristics of three different DCT coefficients for Y, U, V. If it is judged as a natural image block, then a mode 0 is selected by a mode changeover switch 7 using a 2-bit select signal. If it is judged as a character image block, then to which one of modes 1, 2 and 3 the block belongs is judged depending on the magnitude of an absolute value of the DCT coefficients and the judged mode is selected in a like manner. In the mode 0, a quantization factor 8 for natural image and a quantization table 12 for natural image are used. In the modes 1, 2 and 3, a quantization factor (large) 9 for characters, a quantization factor (medium) 10 for characters and a quantization factor (small) 11 for characters are used, respectively, along with a quantization table 13 for characters.

More specifically, by way of example, the image area separation unit determines the sum S of absolute values of AC components of the spatial frequency conversion coefficients, except DC components, within the block for each of the components Y, U, V, and compares the magnitude of the sum S with threshold values A, B, C (where A<B<C). It then sets the mode 0 if S<A, the mode 1 if A≦S<B, the mode 2 if B≦S<C, and the mode 3 if C≦S.

In a quantization unit 4, the components Y, U, V are each quantized per 8×8 pixel block by using the quantization factor and the quantization table which correspond to the mode selected by the mode changeover switch 7. At this time, the 2-bit select signal indicating the mode used is encoded in an encode unit 14 into compressed mode data, followed by transmission to the decode side. The mode data is encoded by, for example, entropy encoding such as MH, MR or MMR. As a result, the quantization factor and the quantization table suitable for each of the natural image area and the character image area can be set. For the character image area, in particular, any suitable one of three different quantization factors can be selected depending on the magnitude of an absolute value of the DCT coefficients; i.e., the larger quantization factor is used for the block having the larger absolute value of the DCT coefficients and the smaller quantization factor is used for the block having the smaller absolute value of the DCT coefficients. By so setting, differences in deterioration of characters between different colors can be prevented.

In a Huffman encode unit 5, the quantization coefficients quantized by the quantization unit 4 are subjected to Huffman encoding.

Additionally, the quantization factor 8 for natural images, the quantization factor (large) 9 for characters, the quantization factor (medium) 10 for characters, the quantization factor (small) 11 for characters, the quantization table 12 for natural images, and the quantization table 13 for characters are transmitted to the decode side or stored beforehand in a RAM, ROM, etc. in the decode side.

The compressed data may be expanded in an exactly reversed flow to the above one of signals by omitting the image area separation unit 6. However, the Huffman encode unit 5, the quantization unit 4, the DCT unit 3 and the encode unit 14 are replaced with a Huffman decode unit, a reverse quantization unit, a reverse DCT unit and a decode unit, respectively. The sub sampling unit 2 is required to convert the components in such a manner that with the sub sampling ratio being of 4:1:1, for example, Y1, Y2, Y3, Y4, U1, V1, ... become Y1, Y2, Y3, Y4, U1, U1, U1, U1, V1, V1, V1, V1, ..., or that with the sub sampling ratio being of 4:2:2, for example, Y1, Y2, U1, V1, ... become Y1, Y2, U1, U1, V1, V1, ... The color conversion unit 1 is only required to perform reverse conversion of the above formula (1.0). The quantization factor 8 for natural image, the quantization factor (large) 9 for character, the quantization factor (medium) 10 for character, the quantization factor (small) 11 for character, the quantization table 12 for natural image, and the quantization table 13 for character can be used by being transmitted from the compression side. The reverse quantization is performed in the mode selected by the mode changeover switch 7 in response to the select signal obtained by decoding the mode data in the decode unit.

As explained above, by separating an image into different types of image areas and selecting the quantization factor and the quantization table adaptively for each image area, the present invention is effective to prevent deterioration of a color character image and a CG image, particularly, differences in deterioration of color characters between different colors.

While only two kinds of quantization factors for natural image and characters are referred in the above embodiment, another quantization factor and quantization table for a CG image may be added. Also, while only three kinds of quantization factors for characters, i.e., large, medium and small, are employed in the above, the number of quantization factors for characters may be four, five or more.

Further, although the select signal is encoded in the encode unit 14, it may be directly transmitted as mode data to the expansion side without being encoded.

Figure 2:
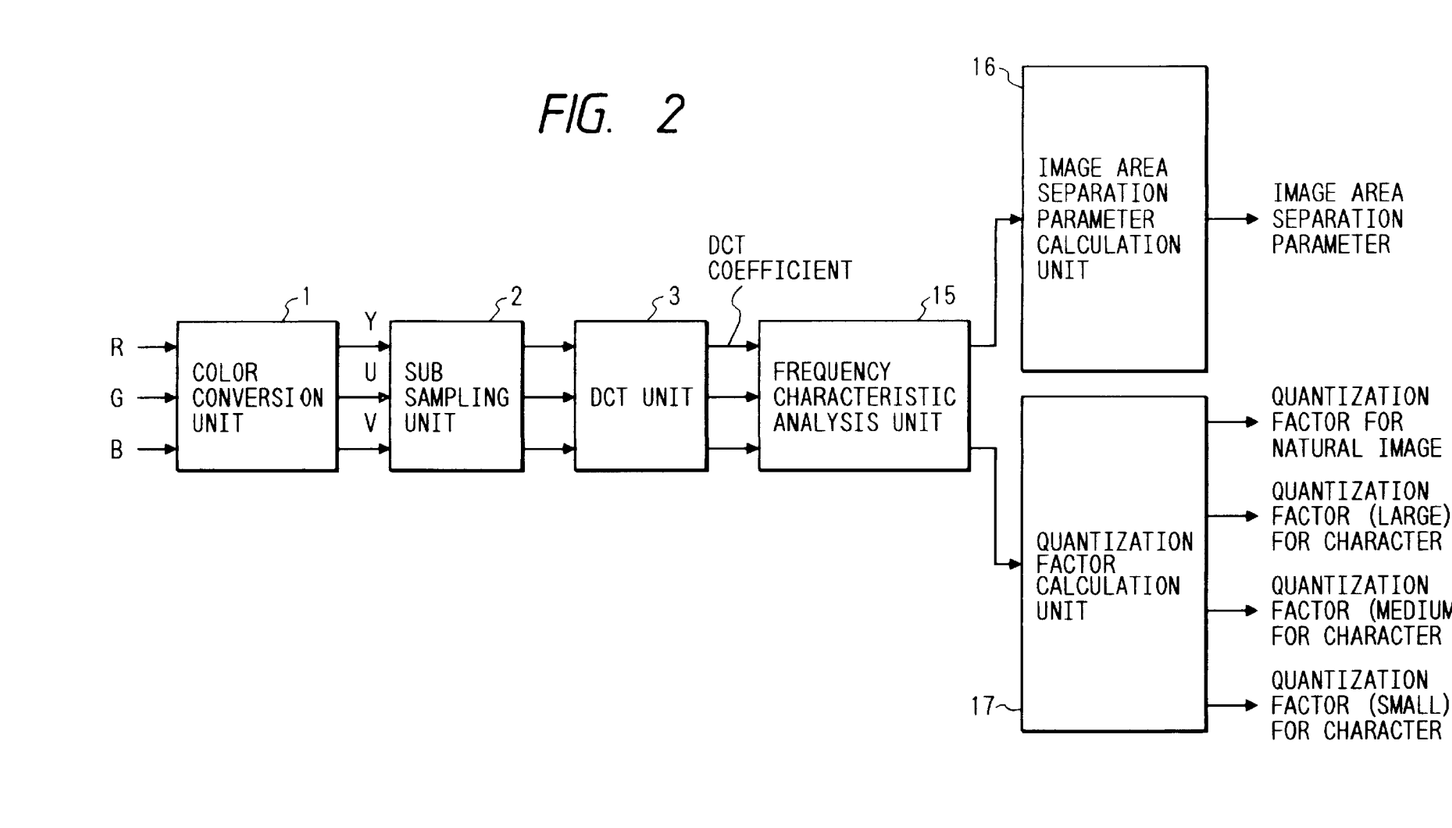
FIG. 2 is a block diagram for calculating an image area separation parameter and quantization factors from pre-scan data.

In the above embodiment, the quantization factors, the quantization tables and the image area separation unit 6 are prepared as having default values. However, since their optimum parameters are different per image, optimum values may be calculated by employing a system shown in a block diagram of FIG. 2 for use in the above apparatus. FIG. 2 will be explained below. Image data obtained by pre-scan is subjected to frequency conversion through the same color conversion unit 1, sub sampling unit 2 and DCT unit 3 as those in FIG. 1. The resultant DCT coefficients are analyzed by a frequency characteristic analysis unit 15, and the analyzed results are inputted to both an image area separation parameter calculation unit 16 and a quantization factor calculation unit 17 where an image area separation parameter, a quantization factor for natural image, and quantization factors (large, medium, small) for character are calculated. Here, the term "image area separation parameter" means a parameter necessary for separation into image areas. The encoded data are stored in a memory and then transmitted via a public line or decoded for display on a monitor to obtain a hard copy by a laser printer or a bubble jet printer (using a head disclosed in U.S. Pat. No. 4,723, 129).

Figure 3:
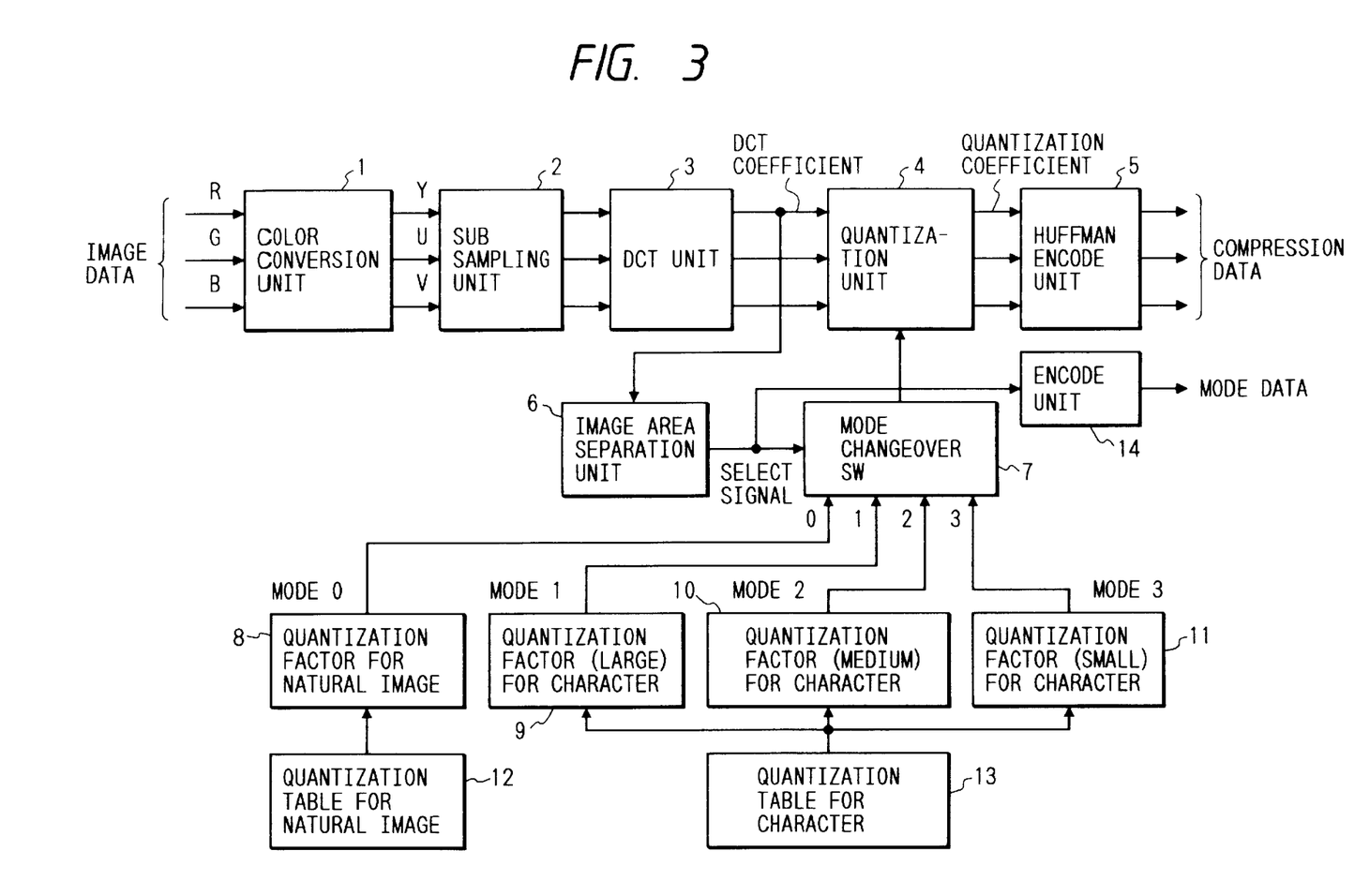
FIG. 3 is a block diagram of another embodiment of the present invention.

FIG. 3 shows a modification of the above embodiment. Components having similar functions as those in FIG. 1 are denoted by the same reference numerals and will not be described here.

In FIG. 3, the image area separation unit 6 selects any suitable one of modes 0 to 4 in accordance with only the Y (luminance) data Y. Quantization factors for the U, V data are selected to match with the mode signal for the Y data of the same block. This is based on the fact that image features are likely to be extracted from the luminance component, and enables simplification of the circuit configuration.

Figures 4, 4A:
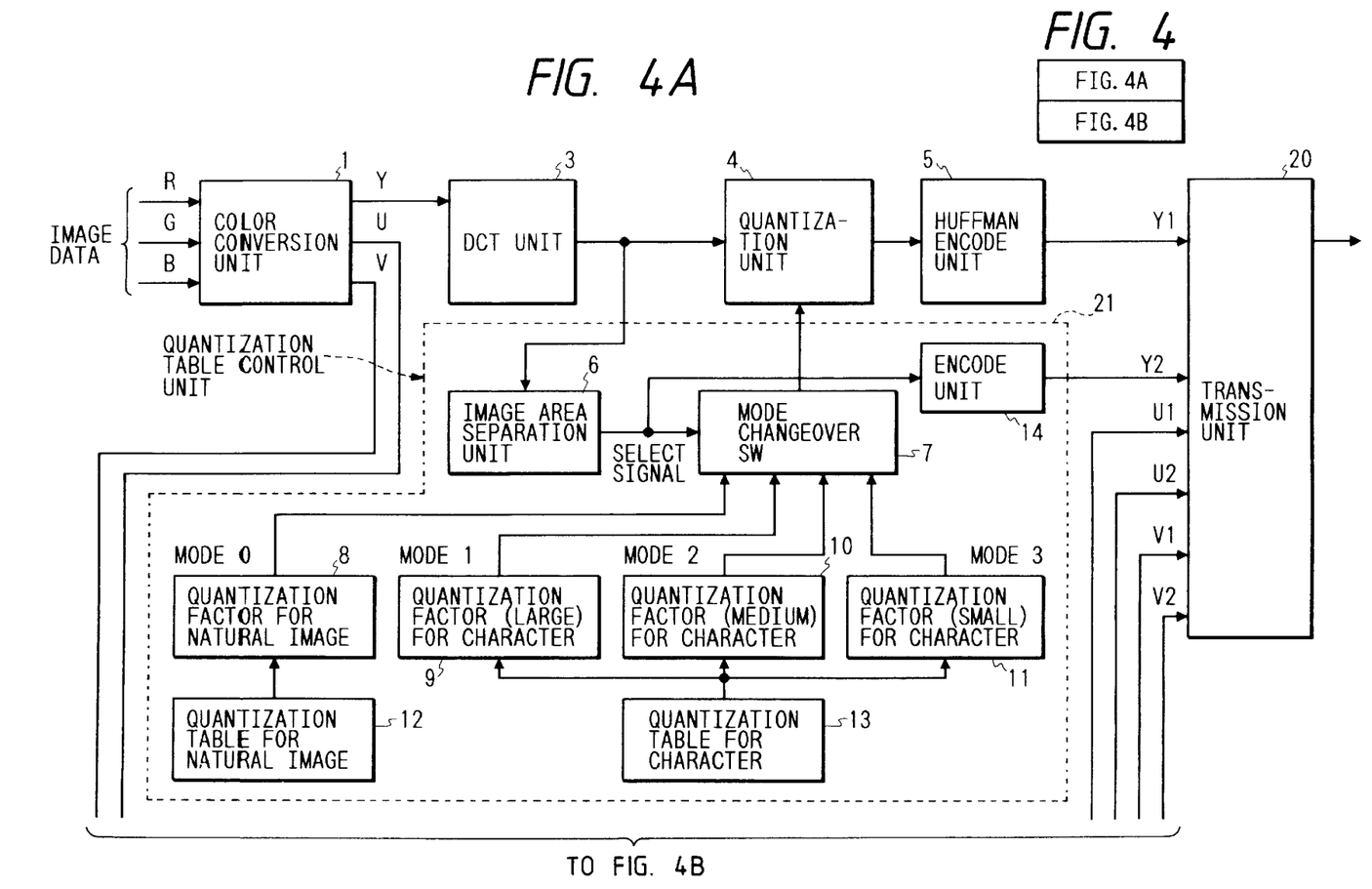
FIGS. 4A and 4B are a block diagram of a still another embodiment of the present invention.
Figure 4B:
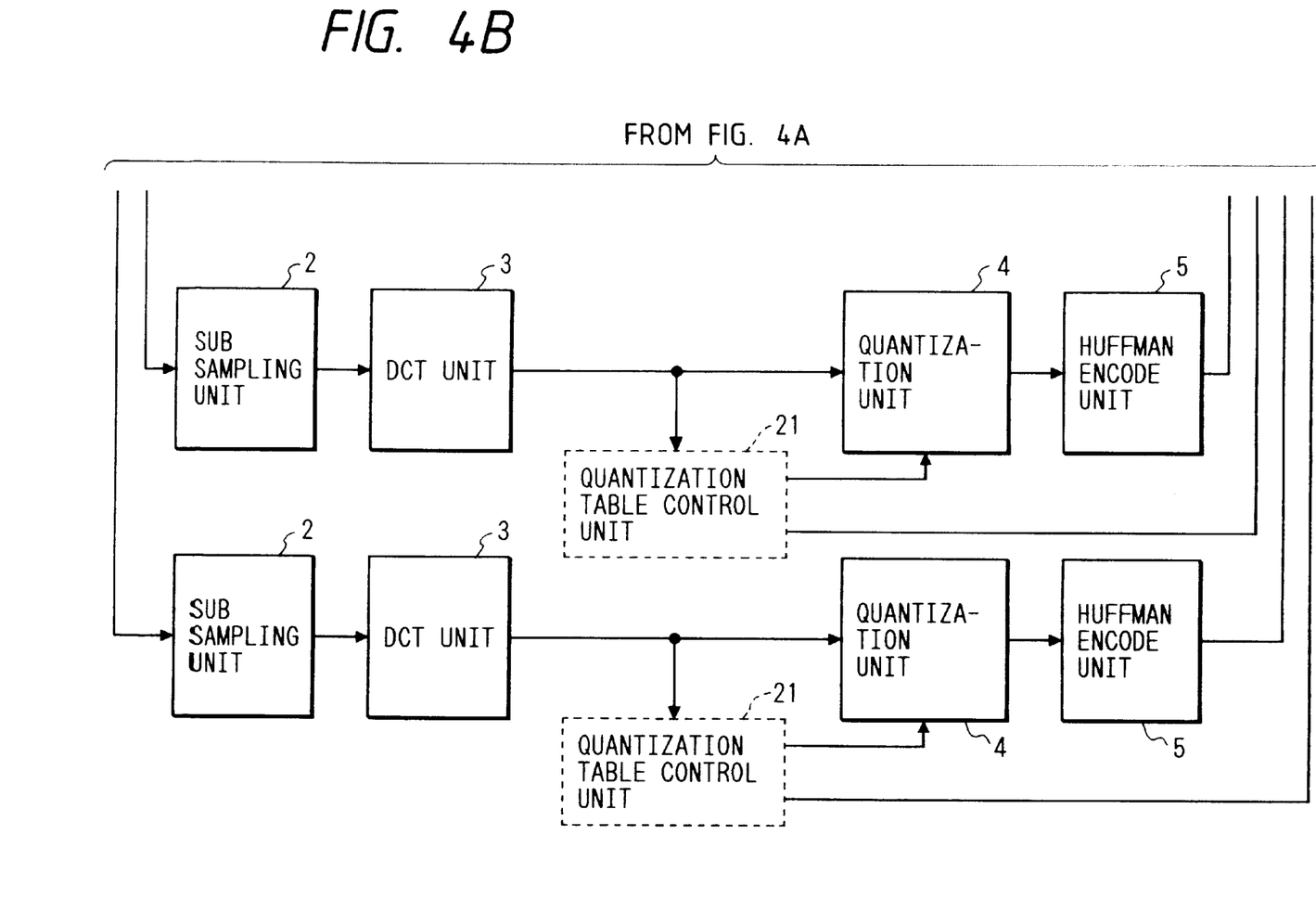

In another embodiment of FIG. 4, the DCT unit 3, the quantization unit 4, the Huffman encode unit 5 and a quantization table control unit 21 are provided for each of Y, U, V independently so as to permit parallel processing of those component signals. The quantization control unit 21 comprises the image area separation unit 6, the mode changeover switch 7, the quantization factor generators 8 to 11, the quantization tables 12, 13, and the encode unit 14 shown in FIG. 1

Encoded data Y1, Y2, U1, U2, V1, V2 produced by encoding the components Y. U, V in parallel are stored in a transmission unit 20 and then transmitted therefrom per block in the order of Y1, Y2, U1, U2, V1, V2, for example. The order of transmission may be the frame sequential order of Y, U, V.

According to the present invention, as described above, it is possible to prevent deterioration of an image in the process of compressing the image.

It should be understood that the present invention is not limited to the embodiments as set forth above and may be variously changed and modified within the scope of the invention defined in the attached claims.

What is claimed is:

1. An image processing apparatus comprising:
generation means for generating color image data;
conversion means for converting the color image data to spatial frequency components;
discrimination means for discriminating whether the color image data represents a first kind of image or a second kind of image; and
quantization means for quantizing the spatial frequency components by selecting for use a single first quantizing parameter suited for the first kind of image when the color image represents the first kind of image and by selecting one of a plurality of kinds of second parameters for use as a second quantizing parameter suited for the second kind of image when the color image data represents the second kind of image, said quantization means quantizing the spatial frequency components using the selected quantizing parameter.

2. An image processing method comprising the steps of:
generating color image data;
converting the color image data to spatial frequency components;
discriminating whether the color image data represents a first kind of image or a second kind of image; and
quantizing the spatial frequency components by selecting for use a single first quantizing parameter suited for the first kind of image when the color image represents the first kind of image and by selecting one of a plurality of kinds of second parameters for use as a second quantizing parameter suited for the second kind of image when the color image data represents the second kind of image, said quantization step quantizing the spatial frequency components using the selected quantizing parameter.

3. An image processing apparatus comprising:
generation means for generating color image data;
conversion means for converting the color image data to spatial frequency components;
discrimination means for discriminating whether the color image data represents a natural image or a color character image on the basis of a size of a value of the spatial frequency components; and
quantization means for quantizing the spatial frequency components by selecting for use a single first quantizing parameter suited for a natural image when the color image data represents a natural image and by selecting one of a plurality of kinds of second parameters for use as a second quantizing parameter suited for a color character image when the color image data represents a color character image, said quantization means quantizing the spatial frequency components using the selected quantizing parameter.

4. An apparatus according to claim 3, wherein said discrimination means executes the discrimination on the basis of an AC component of the spatial frequency components.

5. An apparatus according to claim 4, wherein said discrimination means executes the discrimination by comparing a sum of absolute values of AC components of the spatial frequency components with at least one threshold value.

6. An apparatus according to claim 3, wherein said apparatus further determines whether the color image data represents a color graphics image, said quantization means selecting a third quantization parameter for quantizing the spatial frequency components when the color image data represents a color graphics image.

7. An image processing method comprising the steps of:
generating color image data;
converting the color image data to spatial frequency components;
discriminating whether the color image data represents a natural image or a color character image on the basis of a size of a value of the spatial frequency components; and
quantizing the spatial frequency components by selecting for use a single first quantizing parameter suited for a natural image when the color image data represents a natural image and by selecting one of a plurality of kinds of second parameters for use as a second quantizing parameter suited for a color character image when the color image data represents a color character image, said quantization step quantizing the spatial frequency components using the selected quantizing parameter.

8. An image processing apparatus comprising:

generation means for generating color image data;

conversion means for converting the color image data to spatial frequency components;

discrimination means for discriminating whether the color image data represents a first kind of image or a second kind of image on the basis of a size of a value of the spatial frequency components; and quantization means for quantizing the spatial frequency components by selecting for use a single first quantizing parameter suited for the first kind of image when the color image represents the first kind of image and by selecting one of a plurality of kinds of second parameters for use as a second quantizing parameter suited for the second kind of image when the color image data represents the second kind of image, said quantization means quantizing the spatial frequency components using the selected quantizing parameter.

9. An apparatus according to claim 8, wherein said discrimination means executes the discrimination on the basis of an AC component of the spatial frequency components.

10. An apparatus according to claim 9, wherein said discrimination means executes the discrimination by comparing a sum of absolute values of AC components of the spatial frequency components with at least one threshold value.

11. An apparatus according to claim 8, wherein the first kind of image is a character image and the second kind of image is a natural image.

12. An apparatus according to claim 8, wherein said apparatus further determines whether the color image data represents a third kind of image, said quantization means selecting a third quantization parameter for quantizing the spatial frequency components when the color image data represents the third kind of image.

13. An image processing method comprising the steps of:

generating color image data;

converting the color image data to spatial frequency components;

discriminating whether the color image data represents a first kind of image or a second kind of image on the basis of a size of a value of the spatial frequency components; and quantizing the spatial frequency components by selecting for use a single first quantizing parameter suited for the first kind of image when the color image represents the first kind of image and by selecting one of a plurality of kinds of second parameters for use as a second quantizing parameter suited for the second kind of image when the color image data represents the second kind of image, said quantization step quantizing the spatial frequency components using the selected quantizing parameter.

* * * * *

UNITED STATES PATENT AND TRADEMARK OFFICE
CERTIFICATE OF CORRECTION

PATENT NO. : 5,930,386

DATED : July 27, 1999

INVENTOR(S) : KAZUHIRO SAITO

Page 1 of 2

It is certified that error appears in the above-identified patent and that said Letters Patent is hereby corrected as shown below:

```
On the Title Page:
[56] REFERENCES CITED

Foreign Patent Documents
   "9101613 2/1991 WIPO." (First occurrence) should
      be deleted.
```

COLUMN 2

```
   Line 60, "eliminate" should read --to eliminate--.
```

COLUMN 3

```
   Line 7, "etc." should read --etc.,--.
   Line 19, "formulas:" should read --formula:--.
   Line 26, "an" should read --a--.
   Line 46, "image" should read --images--.
   Line 47, "image" should read --images--.
```

UNITED STATES PATENT AND TRADEMARK OFFICE
CERTIFICATE OF CORRECTION

PATENT NO. : 5,930,386

DATED : July 27, 1999

INVENTOR(S) : KAZUHIRO SAITO

Page 2 of 2

It is certified that error appears in the above-identified patent and that said Letters Patent is hereby corrected as shown below:

<u>COLUMN 4</u>

```
Line 54, "image" should read --images--; and
   "referred" should read --referred to--.
```

Signed and Sealed this

Third Day of April, 2001

Attest:

NICHOLAS P. GODICI

*Attesting Officer*  Acting Director of the United States Patent and Trademark Office